(12) United States Patent
Farquer

(10) Patent No.: US 11,001,110 B2
(45) Date of Patent: May 11, 2021

(54) VIBRATION AND LOAD TRAILER DAMPENING SYSTEM

(71) Applicant: Colton Farquer, Oakdale, CA (US)

(72) Inventor: Colton Farquer, Oakdale, CA (US)

( * ) Notice: Subject to any disclaimer, the term of this patent is extended or adjusted under 35 U.S.C. 154(b) by 0 days.

(21) Appl. No.: 16/840,431

(22) Filed: Apr. 5, 2020

(65) Prior Publication Data
US 2020/0324592 A1 Oct. 15, 2020

Related U.S. Application Data

(60) Provisional application No. 62/831,845, filed on Apr. 10, 2019.

(51) Int. Cl.
| | |
|---|---|
| *B60D 1/24* | (2006.01) |
| *B60D 1/06* | (2006.01) |
| *B62D 53/08* | (2006.01) |
| *B60D 1/42* | (2006.01) |
| *F16F 9/50* | (2006.01) |
| *F16F 9/19* | (2006.01) |

(52) U.S. Cl.
CPC ............. *B60D 1/249* (2013.01); *B60D 1/06* (2013.01); *B60D 1/42* (2013.01); *B62D 53/0842* (2013.01); *B62D 53/0885* (2013.01); *F16F 9/19* (2013.01); *F16F 9/50* (2013.01)

(58) Field of Classification Search
CPC . B60D 1/249; B60D 1/42; B60D 1/06; B62D 53/0842; B62D 53/0885; F16F 9/19; F16F 9/50
USPC ...................................................... 180/446.1
See application file for complete search history.

(56) References Cited

U.S. PATENT DOCUMENTS

| | | | | |
|---|---|---|---|---|
| 3,503,588 | A | * | 3/1970 | Bach .......................... B60S 9/12 254/419 |
| 4,460,194 | A | * | 7/1984 | McGhie ............. B62D 53/0842 280/443 |
| 5,683,094 | A | | 11/1997 | Gullickson |
| 5,868,415 | A | | 2/1999 | Van Vleet |
| 6,170,849 | B1 | | 1/2001 | McCall |
| 6,746,037 | B1 | | 6/2004 | Kaplenski et al. |
| 6,854,757 | B2 | | 2/2005 | Rehme |
| 7,338,063 | B2 | | 3/2008 | Graber |
| 9,802,452 | B1 | | 10/2017 | McCall |

\* cited by examiner

*Primary Examiner* — Kevin Hurley
*Assistant Examiner* — Felicia L. Brittman
(74) *Attorney, Agent, or Firm* — Johan Eide; Christopher Pilling; My Patent Guys

(57) ABSTRACT

The present invention relates to a trailer dampening system for dampening during variable road conditions experienced during long hours of travel. Secondly, the trailer dampening system encompasses a universal design that will allow for easy installation and application to multiple trailers. The trailer dampening system is provided having a barrel assembly joined to the trailer, a cylinder rod assembly adjoined to the barrel assembly by a connection assembly wherein a connection assembly first opening is configured to receive a coupler end cap proximal end of the cylinder rod assembly. In some embodiments, there is a reservoir system having a main reservoir, a valve assembly, and at least one connection line. In some embodiments, the trailer dampening system further comprises an electrical control system connected to the valve assembly and having an input device configured to receive an input, a battery, a plurality of sensors, and a microcontroller.

26 Claims, 19 Drawing Sheets

VIBRATION AND LOAD TRAILER DAMPENING SYSTEM

BACKGROUND

1. Field of the Invention

The present invention relates to a vibration and load trailer dampening system.

2. Description of Related Art

The modern horse trailer is the most popular and easiest method of transporting horses. Trailers commonly utilize two methods of connection, a gooseneck hitch and a bumper pull hitch. A gooseneck hitch is the most common hitch found on large trailers used for hauling long distances. Adverse road conditions are known to cause damage to the tow vehicle, trailer and transported livestock. The transport of horses has been a concerning issue for many years and has proven to increase the "transport stress" of horses. Currently there have been relatively few attempts to explain why horses adapt poorly to surface transit or more importantly propose fundamental solutions to equine transport problems.

The problems with transit stress can be broken down into three categories including stress associated with loading, stress related to the trip itself and stress caused by the dynamic motion of the trailer. Transport can result in physical injury and often occurs due to collisions involving the transport vehicle, sudden stops, therein fatigue and loss of balance to the horse. Transport stress can also be associated and a direct cause of dysfunctions such as trailer choke, shipping fever, laminitis, colitis, rupture of uterine arteries and severe weight loss.

During short distances and short durations, vertical movement caused by bumps has an observable effect on the balancing abilities of horses. Additionally, during longer periods the suspension of the vehicle will have major impact on the fatigue, performance and well-being of the horse. The physics of current dampening solutions, typically induced on the axles of a vehicle, can translate to the areas of the trailer experiencing intense loading. Current common fixes included modifications to leaf springs, air-suspensions, shock absorbers and tire combinations. Additionally, these common fixes are typically designed for the specific model of vehicle they are adjoined to, therein limiting their availability and compatibility with multiple vehicles.

A solution is needed to overcome the potential physical injury of horses caused by adverse road conditions. A solution is also needed for a modular system that is compatible, customizable and adaptable to accommodate different livestock transported and different user vehicles.

SUMMARY

The present invention solves two problems presented above by providing a trailer dampening system for dampening during variable road conditions experienced during long hours of travel. Secondly, this trailer dampening system encompasses a universal design that will allow for easy installation and application to multiple horse trailers at an affordable price in comparison to other industry alternatives. The trailer dampening system is also adaptable to multiple user vehicles and trailers. The trailer dampening system replaces the rigid gooseneck coupler with a pressurized barrel assembly capable of absorbing large forces and vibrations experienced during hauling.

Another object of the invention is to provide a trailer dampening system for use outside of livestock transport in recreational trailers, utility trailers and any other common trailer application known to one skilled in the art. By moving the trailer dampening system to the tongue of the trailer, the system allows for both the trailer and truck to experience the benefits of increased dampening through a hydraulic shock absorber.

In order to do so, a trailer dampening system is provided having a a barrel assembly joined to the trailer, a cylinder rod assembly and a connection assembly wherein a connection assembly is configured to receive various hitch types of commercially available trucks and trailers. In some embodiments, a reservoir system having a main reservoir, a valve assembly, and at least one connection line. In some embodiments, the trailer dampening system further comprises an electrical control system connected to the valve assembly and having an input device configured to receive an input, a battery, a plurality of sensors, and a microcontroller.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
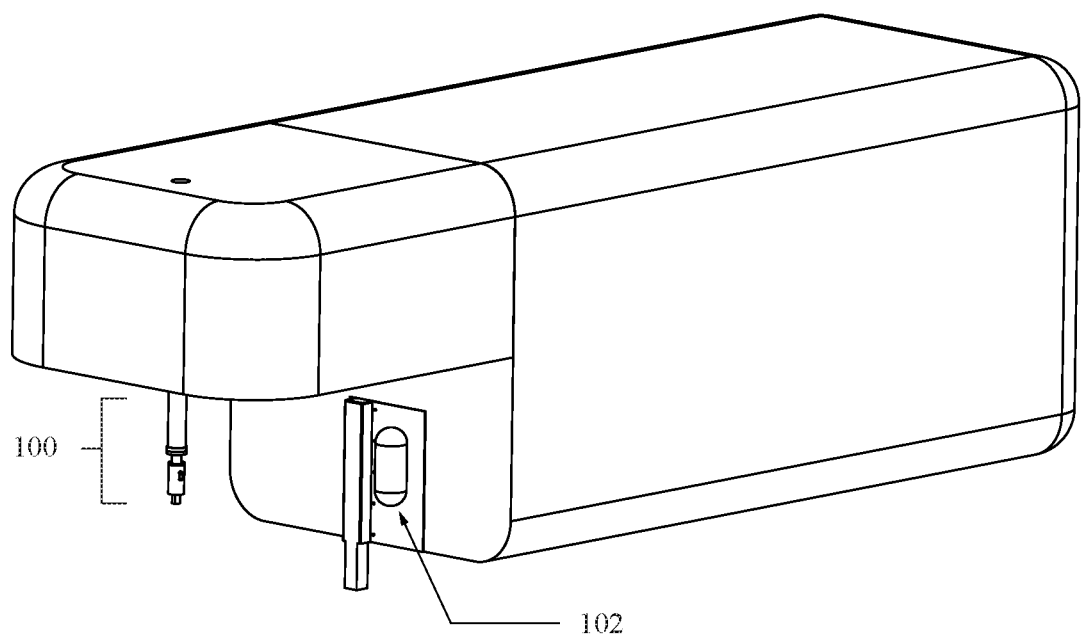
FIG. 1 shows an exemplary perspective view of one embodiment of the trailer dampening system mounted to an exemplary trailer.
Figure 2:
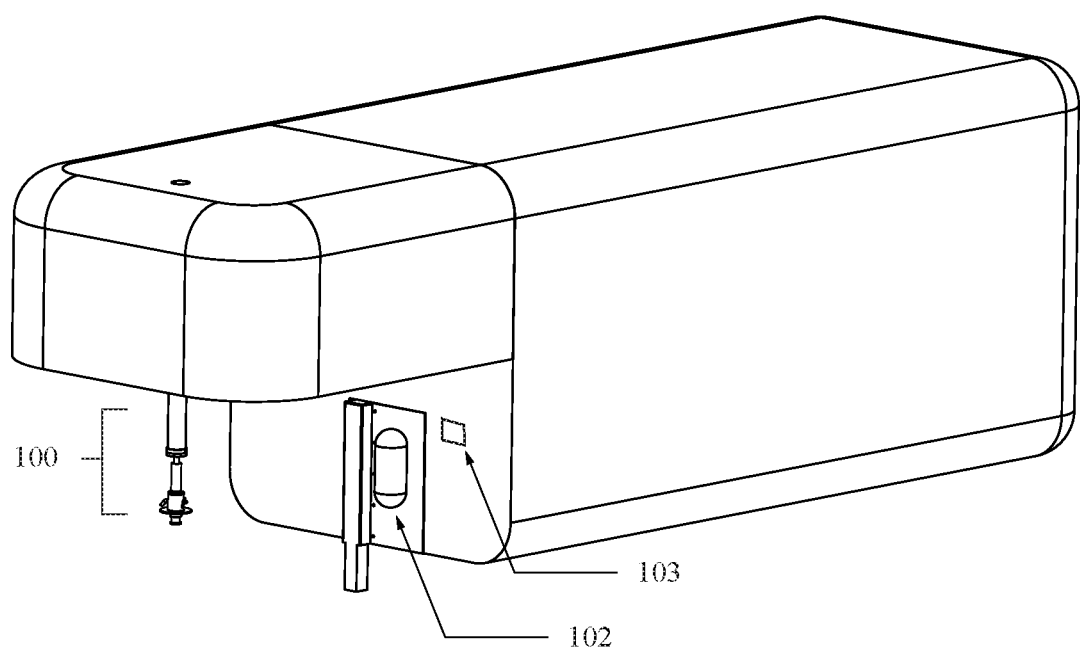
FIG. 2 shows an exemplary perspective view of one embodiment of the trailer dampening system mounted to an exemplary trailer.
Figure 3:
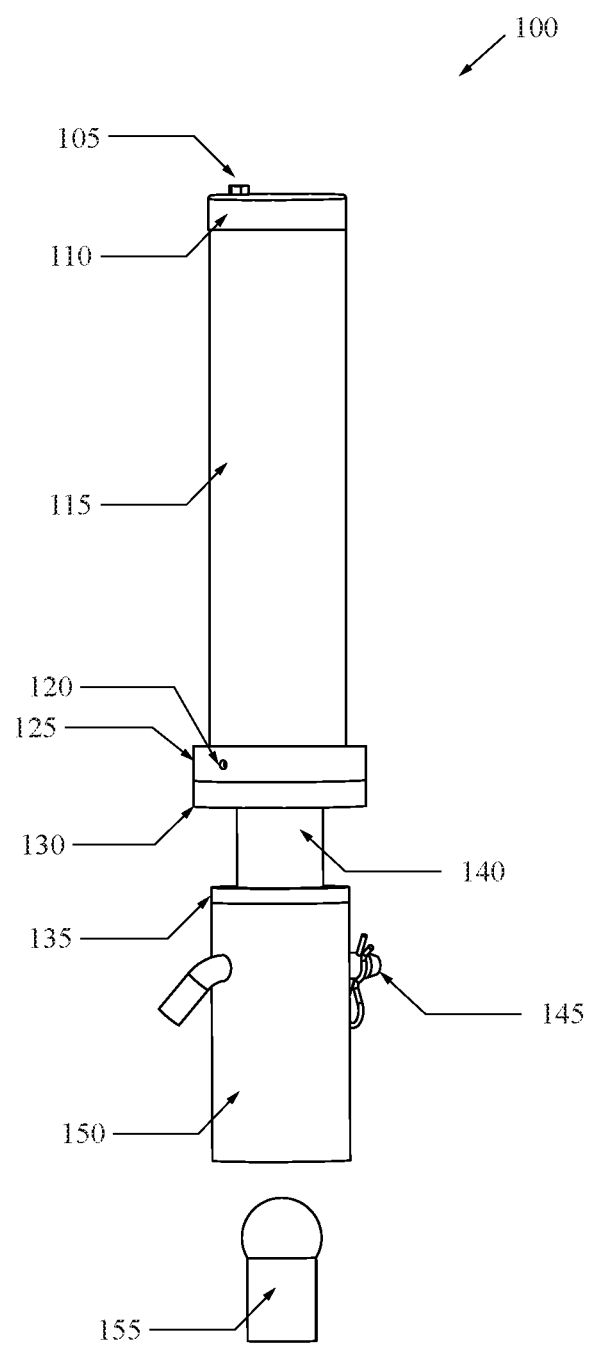
FIG. 3 shows an exemplary front view of one embodiment of the trailer dampening system having a ball hitch embodiment.
Figure 4:
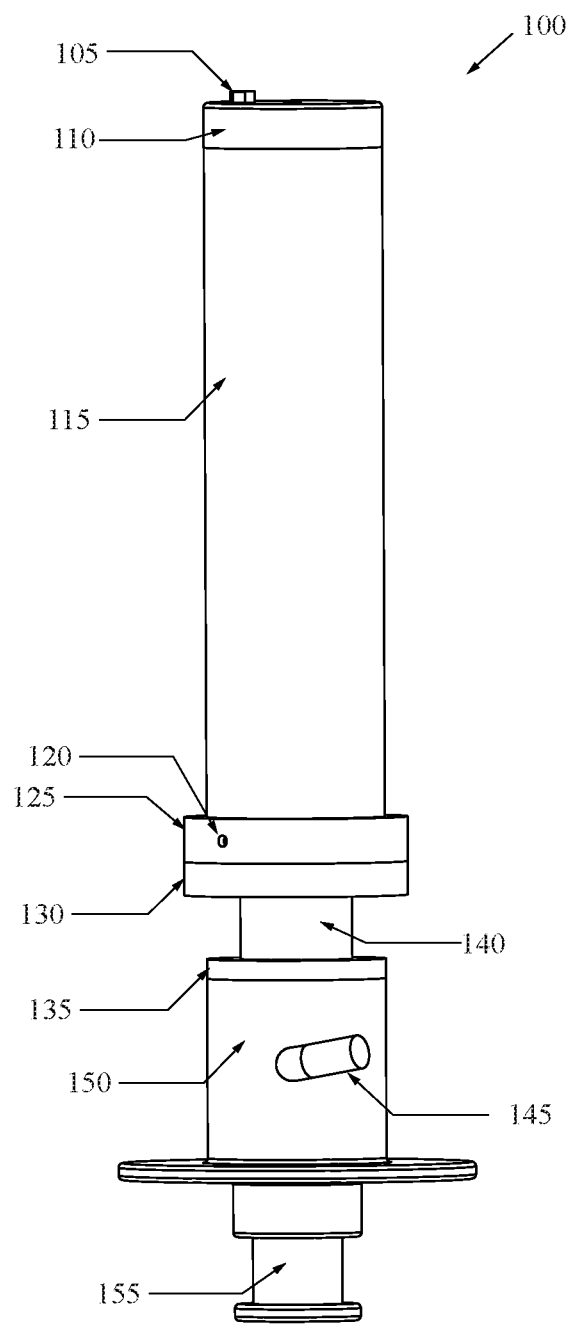
FIG. 4 shows an exemplary left view of one embodiment of the trailer dampening system having a kingpin hitch embodiment.

FIG. 1-2 show an exemplary embodiment of a trailer dampening system 100 mounted to an exemplary trailer configured to have a connection assembly 150 adapted for a ball hitch and configured to have the connection assembly 150 adapted to receive a kingpin hitch, respectively. A reservoir system 102 is shown also adjoined to the trailer.

FIG. 3-7 illustrate multiple exemplary views of the trailer dampening system 100. The trailer dampening system 100 is designed for reducing vibration and movement of a trailer towed by a vehicle and first comprises a barrel assembly having a cylinder barrel 115 which has a proximal end, a distal end, an external surface, an internal surface and an cylinder barrel cavity 116 having an internal volume 117 that is pressurized. The internal volume 117 formed by the space within the cylinder barrel cavity between the cylinder barrel distal end and the piston end cap. In some embodiments, the internal volume of the barrel assembly is pressurized by one member of a pressure material set consisting of: an oil, a fluid, and a volume of pressurized air.

Figure 5:
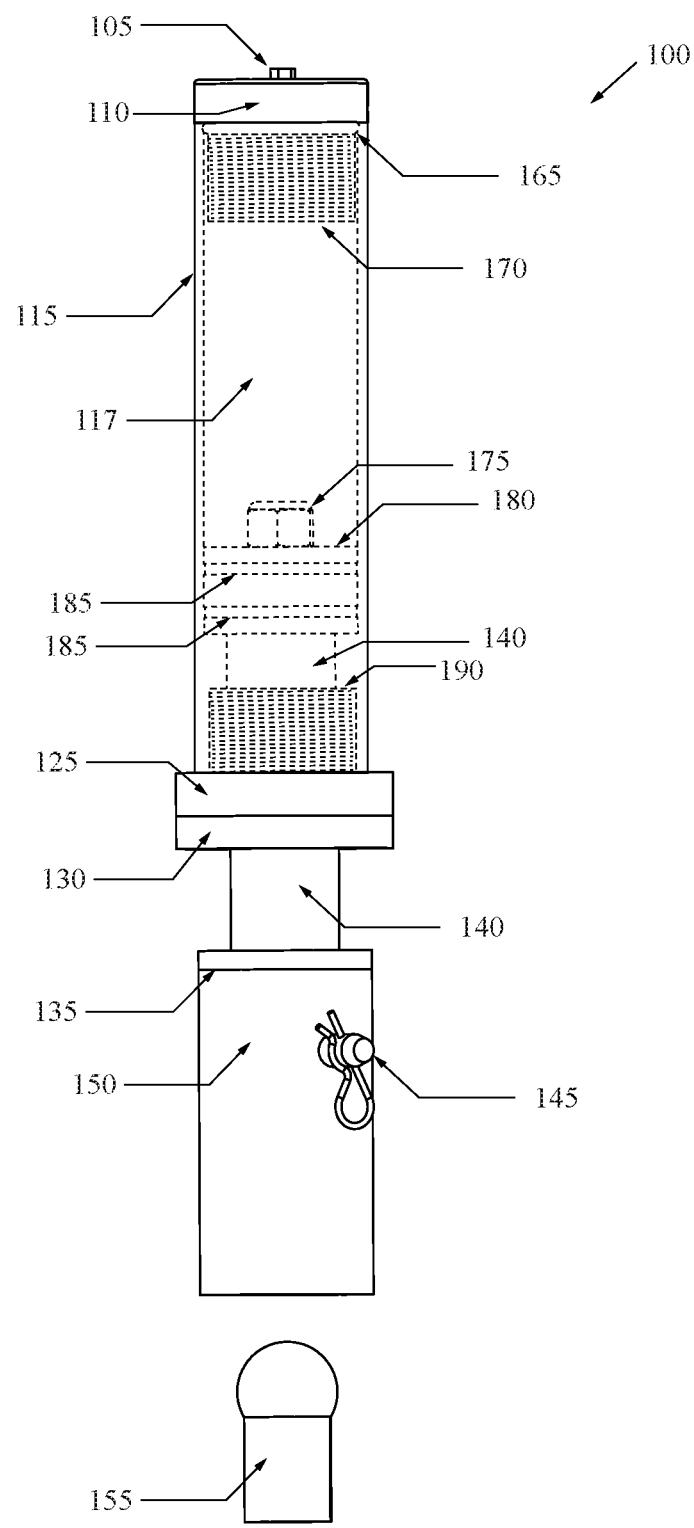
FIG. 5 shows an exemplary right view of one embodiment of the trailer dampening system with components hidden from view within the cylinder barrel shown in dashed lines.
Figure 6:
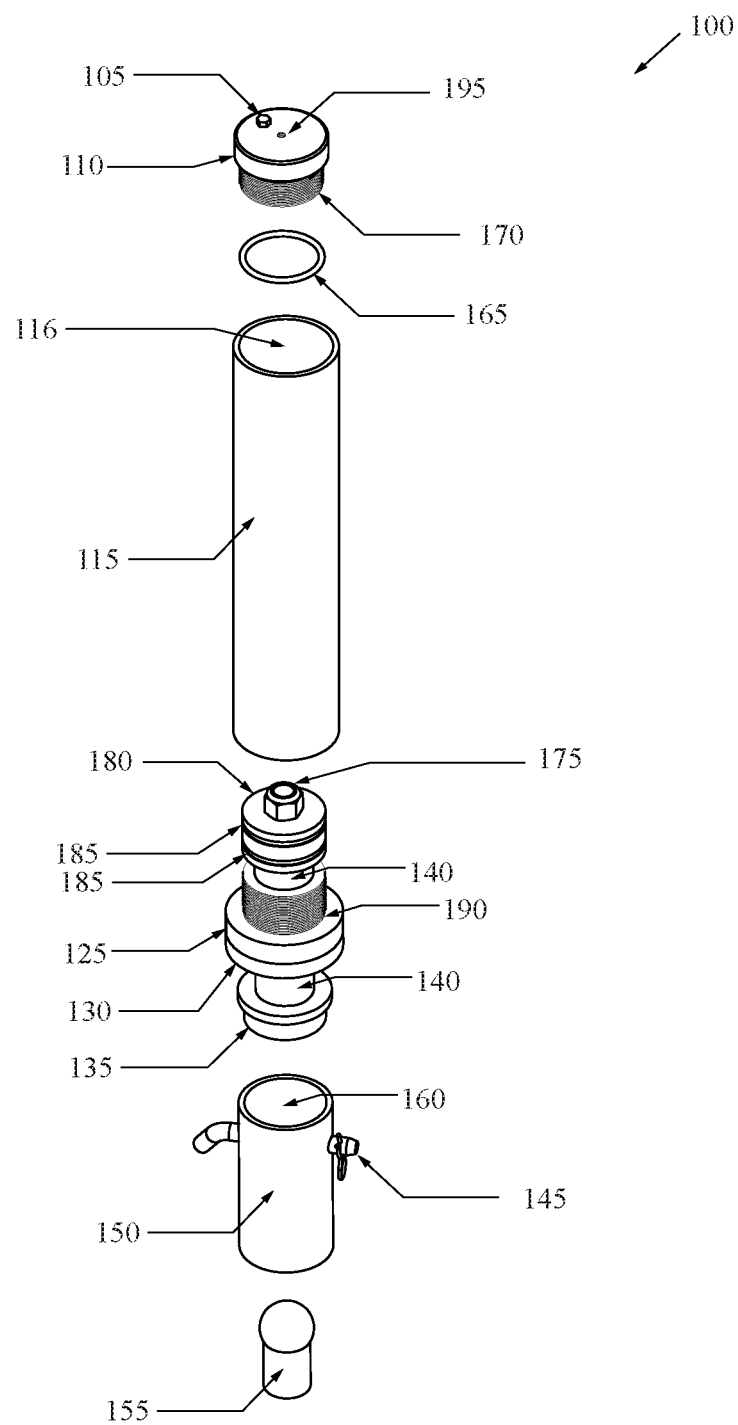
FIG. 6 shows an exemplary exploded view of one embodiment of the trailer dampening system.
Figure 7:
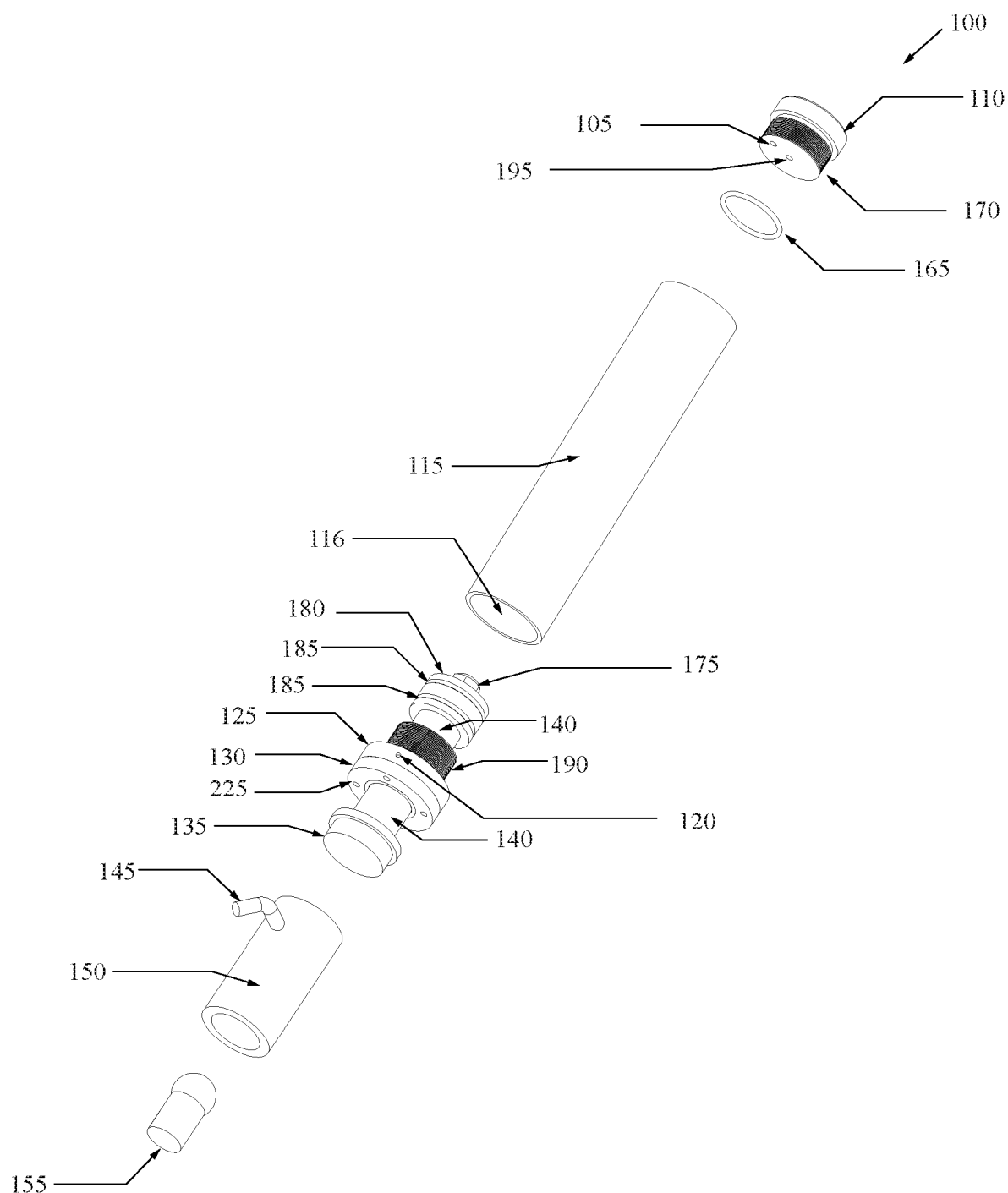
FIG. 7 shows an exemplary exploded view of one embodiment of the trailer dampening system.

The barrel assembly also includes a first end cap 110, having a proximal end, a distal end and at least one port 195. The first end cap 110 is adjoined to the distal end of the cylinder barrel 115. In some embodiments, the first end cap 110 also includes at least one drain plug 105. In some embodiments, the first end cap 110 further comprises at least one port 195. As shown in FIG. 5, in some embodiments the first end cap 110 further comprises a first end cap seal 165. Also shown in FIG. 5, in some embodiments the first end cap 110 further comprises a first external threaded section 170 configured to thread into the cylinder barrel 115 of the barrel assembly.

Next, a second end cap 125, having a proximal end, a first opening 215 and a distal end is adjoined to the proximal end of the cylinder barrel 115. The second end cap 125 further comprises a first opening 215 extending through the second end cap 125 from the proximal end to the distal end of the second end cap 125. A cylinder rod 140 of a cylinder rod 140 assembly protrudes into the cylinder barrel 115 and is free to move within the barrel assembly. The cylinder rod 140 assembly includes the cylinder rod 140 having a proximal end, a distal end, a proximal section, a distal section. The cylinder rod 140 extends through the first opening 215 of the second end cap 125 and the second opening 235 of a base end cap 130.

Within the barrel assembly the base end cap 130 is adjoined to the second end cap 125. The base end cap 130 having the second opening 235 extending through the base end cap 130 and within the second opening 235 a third internal groove 230 adapted to hold a third internal seal 255. In some embodiments, the base end cap 130 further comprises a first protrusion 240 to aide in securing the first internal seal 245 and the second internal seal 250 of the second end cap 125.

Next, within the cylinder rod assembly comprises a cylinder piston head 180, having an external surface and having a third opening 288 extending through the cylinder piston head 180 and having an external groove. The external groove is adapted to hold a first external seal 185 which seals to the internal surface of the cylinder barrel 115 allowing for compression and division of the internal volume of the cylinder barrel 115. In some embodiments, the cylinder piston head 180 further comprises a plurality of the first external seals. A piston cap is adjoined to the distal end of the cylinder rod 140 and secures the cylinder piston head 180 between the piston cap and the proximal section of the cylinder rod 140. On the proximal end of the cylinder rod 140 a coupler end cap 135 is adjoined to the cylinder rod 140. The coupler end cap 135 having a fourth opening 285 extending into the distal end of the coupler end cap 135. The fourth opening 285 is adjoined to the proximal end of the cylinder rod 140. The coupler end cap 135 serves to connect the cylinder rod 140 assembly to a connection assembly 150. The connection assembly 150 having a proximal end, a receiver 155, a distal end and a fifth opening 160. The fifth opening 160 is configured to receive the coupler end cap proximal end 275 of the cylinder rod assembly and the receiver 155 is joined a hitch of the vehicle (not shown). In some embodiments, the coupler end cap 135 further comprises a ridge 280 having a diameter greater than the diameter of the cylinder rod 140.

In some embodiments, the battery of a electrical control system 103 is selected from one member of a battery set consisting of: a lithium-ion battery, a nickel metal hydride battery, a nickel-cadmium cell battery, capacitor energy storage pack, and a mechanical energy storage.

In some embodiments, the input device controls at least one of a control set consisting of: amperage, voltage, gear, polarity, and any digital aspect supplied by the microcontroller.

In some embodiments, the barrel assembly further comprises: a reservoir system 102 having a main reservoir, a valve assembly, and at least one connection line. The valve assembly is adjoined to at least one connection line. At least one connection line connects the main reservoir to at least one port 195 of the barrel assembly. In some embodiments, the valve assembly of the trailer dampening system 100 includes at least one member of a valve set consisting of: a pressure control valve, a flow control valve, and a directional control valves, a directly operated valve, a pilot operated valve, a manually operated valve, an electrically actuated valve, an open control valve, a servo controlled valve, and a manifold. The valve assembly communicatively connected to the electrical control assembly of the trailer dampening system 100. In some embodiments, the valve assembly serving to regulate the pressure and the volume the cylinder barrel 115 and/or the main reservoir. In some embodiments, the valve assembly operates independently from the electrical control assembly. In some embodiments, the reservoir system 102 further comprises a motor (not shown). The motor is connected to at least one connection line of the reservoir system 102 and the electrical control system. In some embodiments, the motor is directly connected to the valve assembly. In some embodiments, the reservoir system 102 is further joined to the vehicle. In some embodiments, the reservoir system 102 is further joined to the trailer. In some embodiments, the reservoir system 102 is further joined to the vehicle and the trailer. In some embodiments, the reservoir system 102 further comprises a plurality of main reservoirs. In some embodiments, the main reservoir further comprises an accumulator.

Figure 8A:
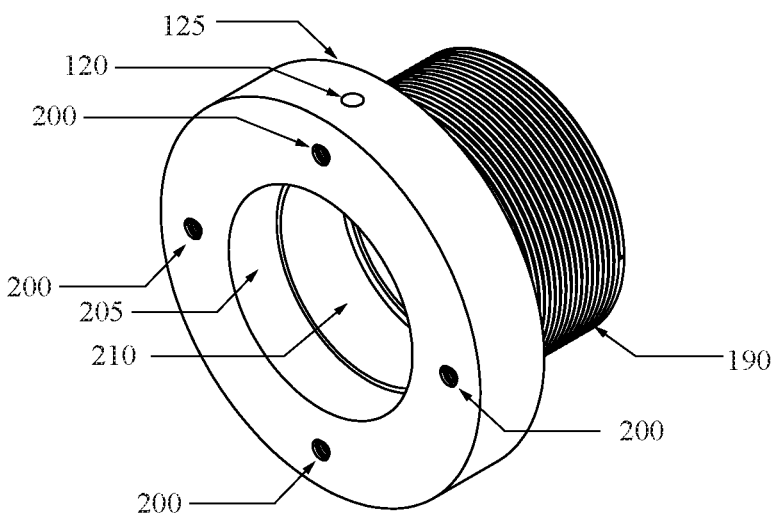
FIG. 8A shows an exemplary perspective view of one embodiment of the second end cap of the trailer dampening system 100.
Figure 8B:
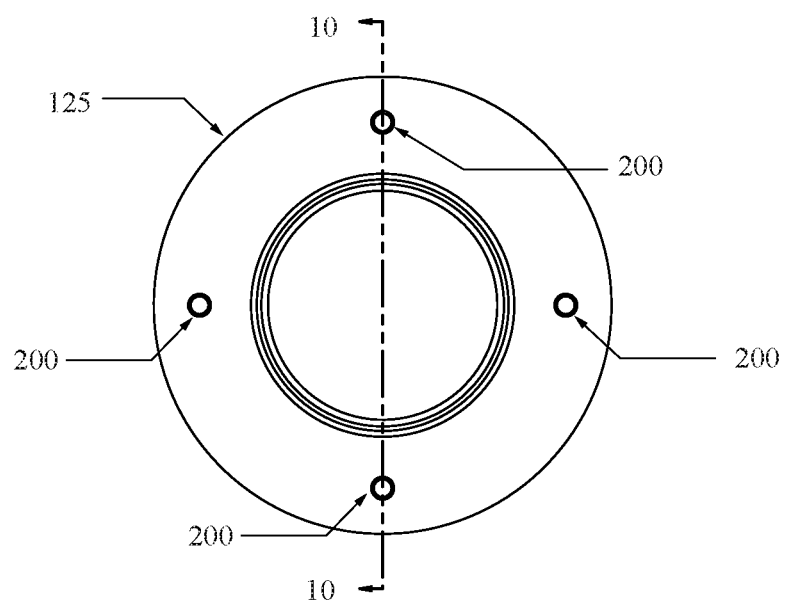
FIG. 8B shows an exemplary front view of one embodiment of the second end cap of the trailer dampening system 100.
Figure 9A:
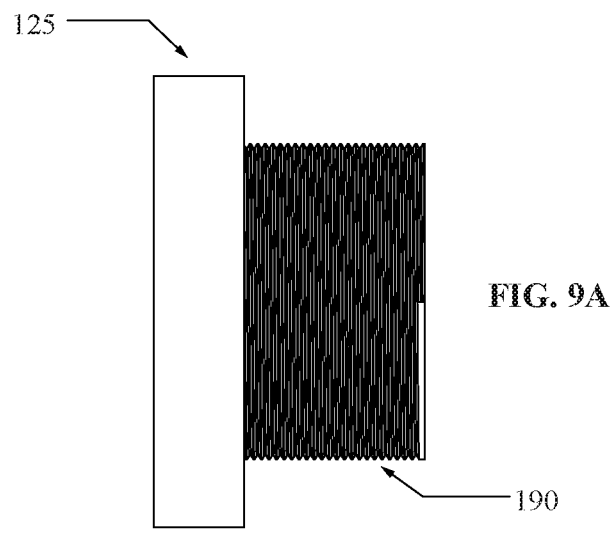
FIG. 9A shows an exemplary right view of one embodiment of the trailer dampening system.
Figure 9B:
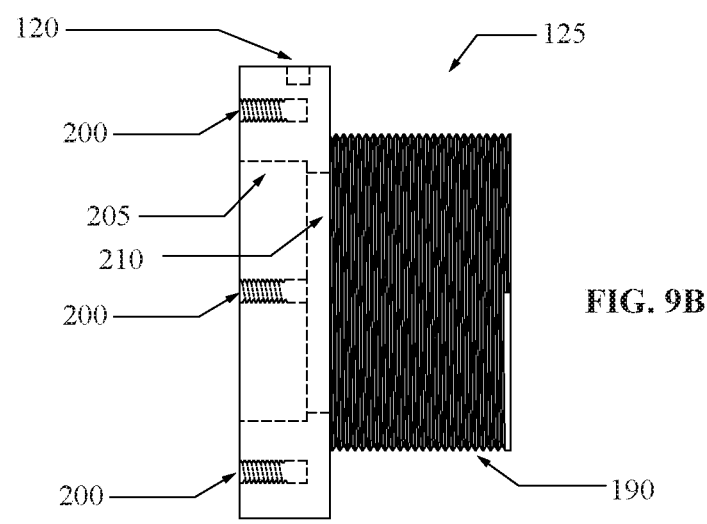
FIG. 9B shows an exemplary right view of one embodiment of the trailer dampening system with components hidden from view shown in dashed lines.
Figure 9C:
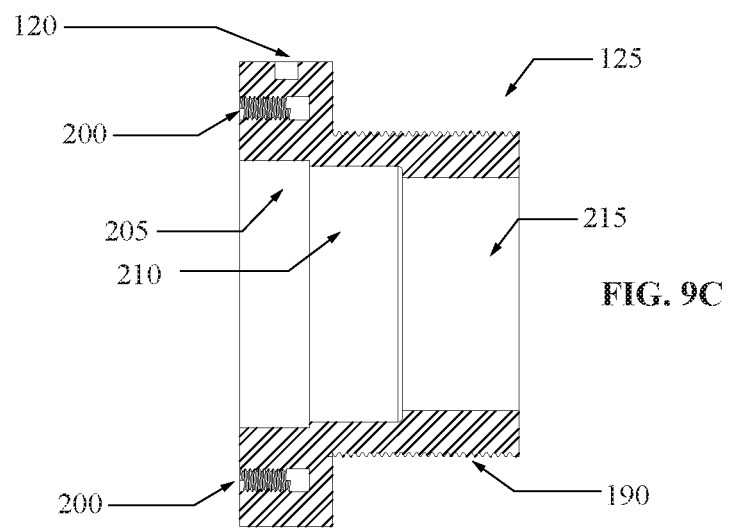
FIG. 9C shows an exemplary cross-sectional view of one embodiment of the trailer dampening system taken along parting line 10-10 of FIG. 8B.

FIG. 8A-8B and FIG. 9A-9C illustrates an exemplary embodiment of the second end cap 125 of the barrel assembly of the trailer dampening system 100. In FIG. 8A the second end cap 125 is shown at a perspective view to show the first internal groove 210 and the second internal groove 205 that are located within the first opening 215. In this embodiment, a first series of holes 200 are positioned on the proximal end of the second end cap 125 and in this embodiment, are threaded. A fastener passes through the base end cap 130 and threaded into the first series of holes 200 to adjoin the base end cap 130 to the second end cap 125. Additionally, the adjoining of the second end cap 125 to the cylinder barrel 115 in this exemplary embodiment is done by a second external threaded section 190. In other embodiments, the second end cap 125 is adjoined to the cylinder barrel 115 by at least one member of an attachment set consisting of: a weld, at least one fastener, an adhesive, at least one threaded surface, a chemical bonding process, a press fit, a clamp, and a spring. An exemplary embodiment a tool connection hole 120 is shown in FIG. 8A, wherein a tool such as a spanner wrench can be inserted into the tool connection hole 120 to secure the second end cap 125 to the cylinder barrel 115. In some embodiments, the second end cap 125 further comprises at least one of the tool connection hole 120. In some embodiments, the second end cap 125 further comprises an external texture to grip a hand of the user. In some embodiments, the external texture further comprises at least one member of a texture set consisting of: indentations, extrusions, knurling, a rough surface, and bumps.

In some embodiments, members of the trailer dampening system 100 are adjoined to one another by at least one member of an attachment set consisting of: a weld, at least one fastener, an adhesive, a chemical bonding process, a press fit, a clamp, a spring.

Figure 10A:
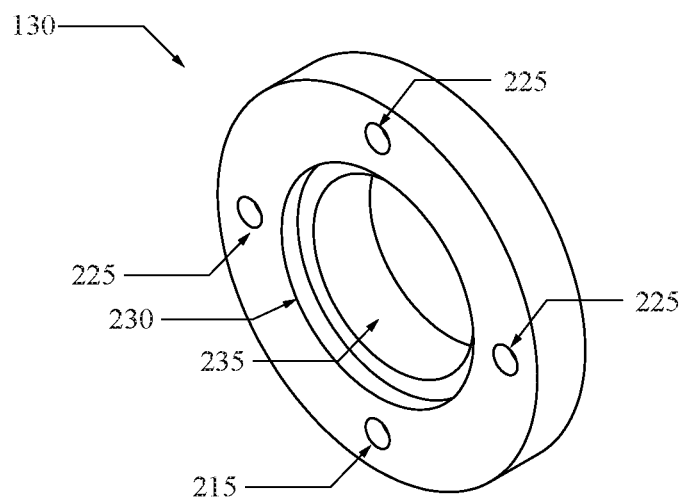
FIG. 10A shows an exemplary perspective view of one embodiment of the base end cap of the trailer dampening system.
Figure 10B:
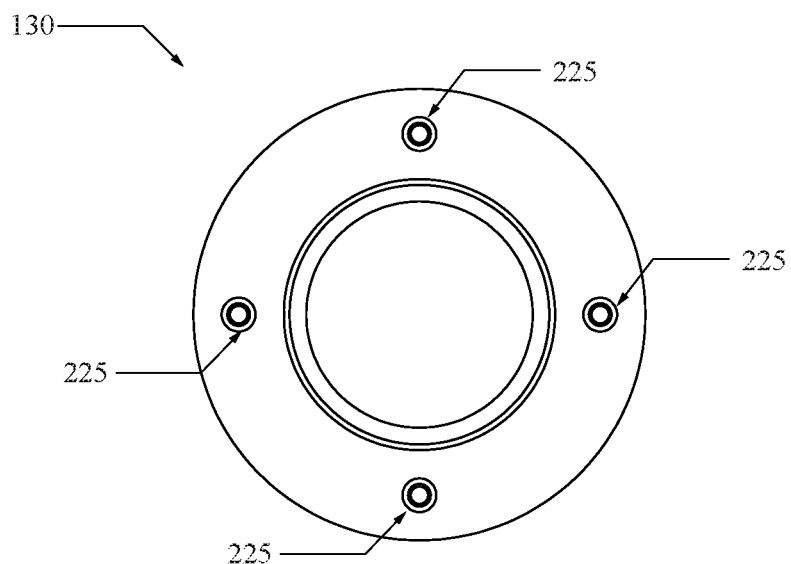
FIG. 10B shows an exemplary front view of one embodiment of the base end cap of the trailer dampening system.
Figure 11:
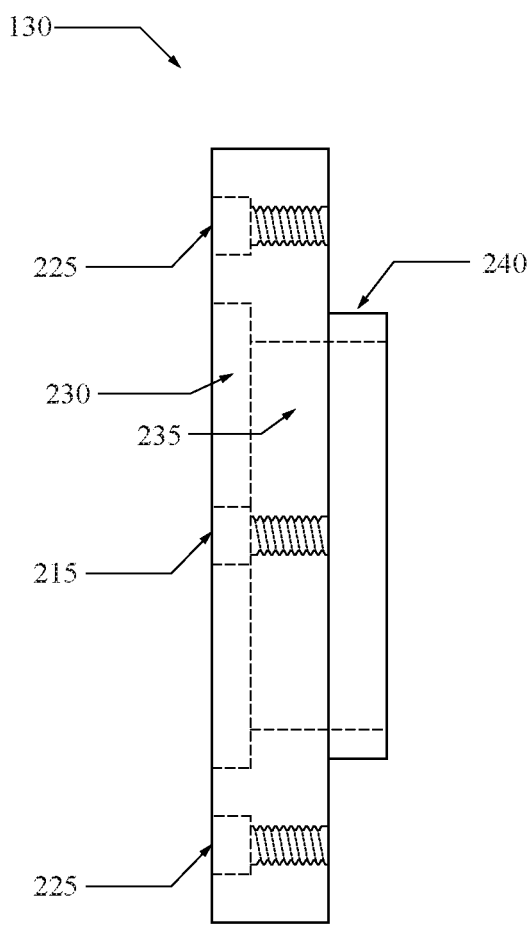
FIG. 11 shows an exemplary right view of one embodiment of the base end cap of the trailer dampening system with internal components hidden from view shown in dashed lines.

FIG. 10A-10B and FIG. 11 illustrate the base end cap 130 of the barrel assembly of the trailer dampening system 100. The second opening 235 is shown protruding through the base end cap 130 and the second opening 235 is further shown to include a third internal groove 230 configured to hold a third internal seal 255. In some embodiments, the third internal seal 255 serves to retain dust and environmental particles outside of the trailer dampening system 100. The third internal seal 255 can comprise a wiper seal or a seal having a rubber sleeve surrounding the cylinder rod 140. In some embodiments, the rubber sleeve is made of at least one member of a sleeve material set consisting of a rubber material, a fabric material, a urethane material, a viton material, a nitrile material and a polymite material. A second series of holes 225 are shown protruding through the base end cap 130 having no internal threads in FIG. 10A and FIG. 10B. In FIG. 11 the base end cap 130 is shown having a second series of holes 225 that are threaded.

Figure 12:
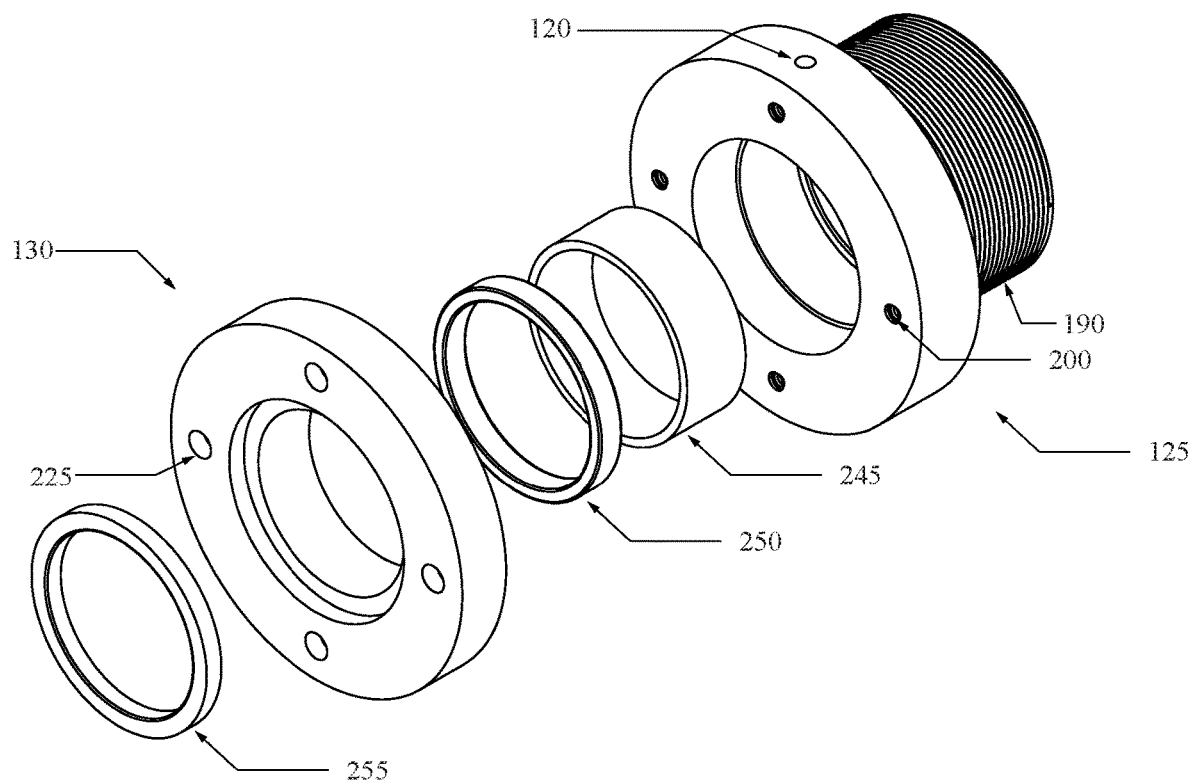
FIG. 12 shows an exemplary exploded view of one embodiment of the trailer dampening system.
Figure 13:
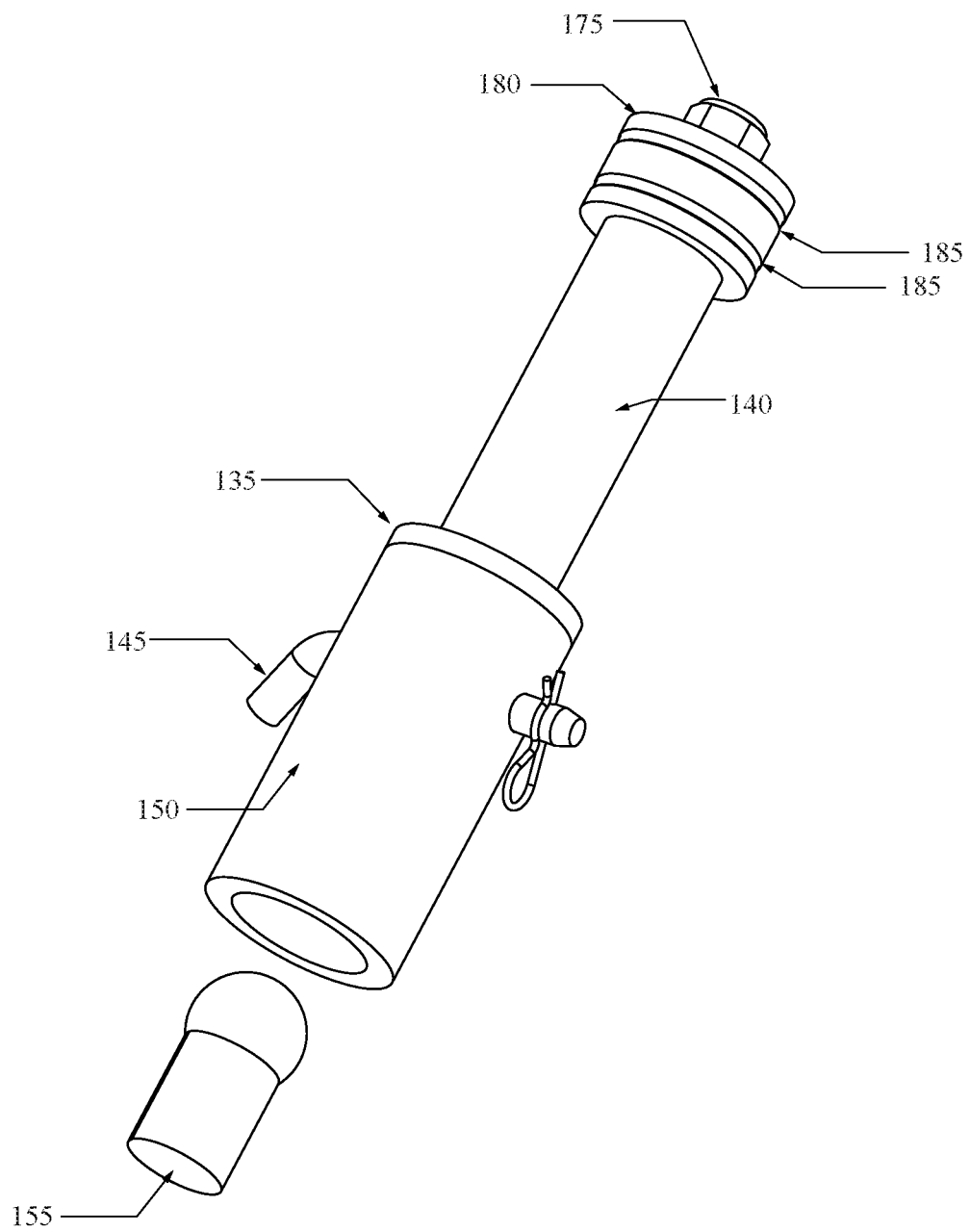
FIG. 13 shows an exemplary perspective view of one embodiment of the cylinder rod assembly and the connection assembly of the trailer dampening system.
Figure 14:
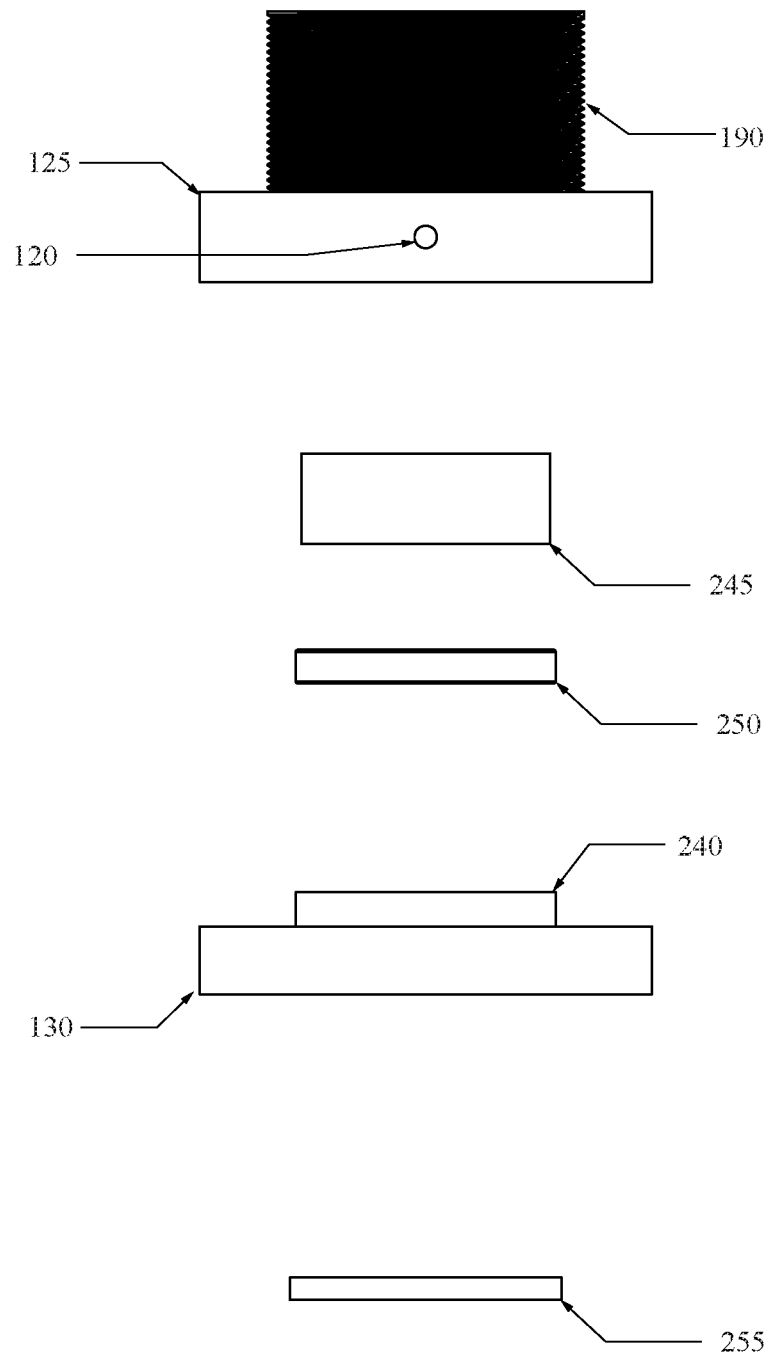
FIG. 14 shows an exemplary exploded view of one embodiment of the trailer dampening system.
Figure 15A:
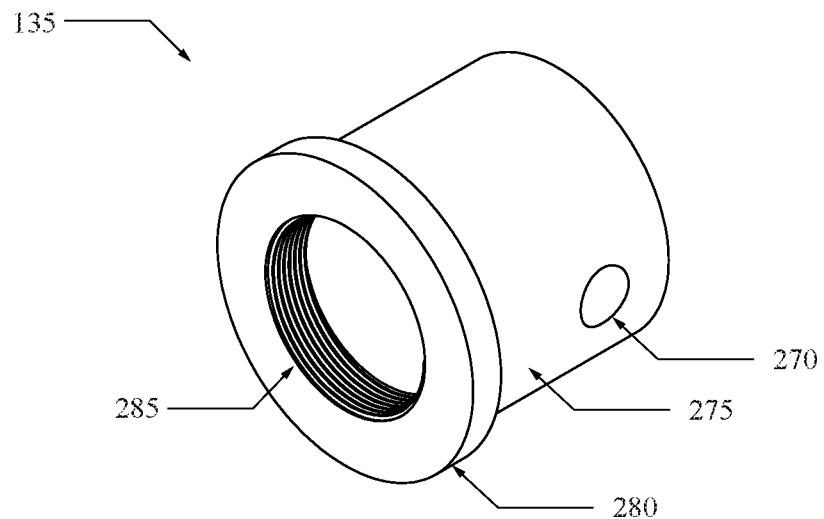
FIG. 15A shows an exemplary perspective view of one embodiment of the trailer dampening system.
Figure 15B:
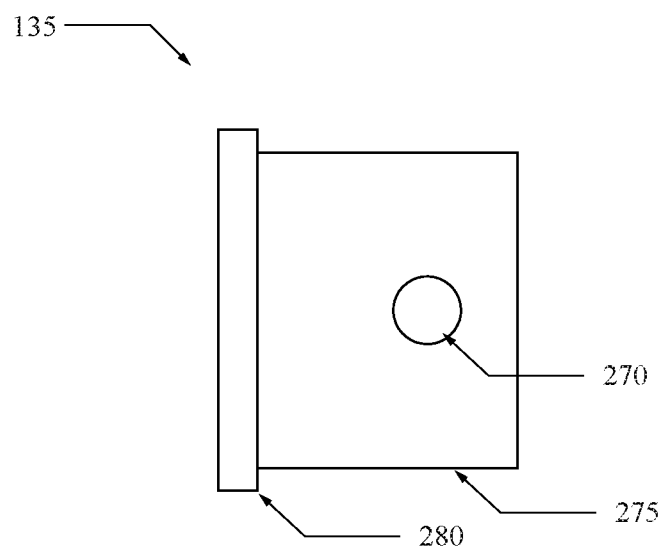
FIG. 15B shows an exemplary right view of one embodiment of the trailer dampening system.

FIG. 12 and FIG. 14 illustrates the assembly of an exemplary embodiment of the second end cap 125 and the base end cap 130. As the second end cap 125 is adjoined to the base end cap 130 within the first opening 215 the first internal seal 245 is inserted into the first internal groove 210 and the second internal seal 250 is next inserted into the second internal groove 205. In some embodiments, the base end cap 130 also aides in holding the first internal seal 245 and the second internal seal 250 within the second end cap 125. A third internal seal 255 is then inserted into the third internal groove 230 of the base end cap 130. In some embodiments, the first end cap 110, the second end cap 125, the base end cap 130 and the cylinder piston head 180 further comprises a plurality of seals.

In some embodiments, the barrel assembly, the cylinder rod 140 assembly and the connection assembly 150 of the trailer dampening system 100 are made of at least one material of an assembly material set consisting of: a metal material, a composite material, a ceramic material, a cast iron material, a stainless steel material, a fiberglass material, a carbon fiber material, and a plastic material. Exemplary materials of the assembly material set include, by way of non-limiting example, the following materials: a 1045 induction hardened chrome plated steel, a 1050 induction hardened chrome plated steel, a 1045 hot rolled steel, a 1050 hot rolled steel, a 1045 micro alloy steel, a 1050 micro alloy steel, a 303 stainless steel, a 304 stainless steel, a 316 stainless steel, a 430FR stainless steel, a 17-4PH stainless steel, a ST52.3 or low carbon manganese steel, a 1020 steel, a 1018 steel, a 1144 steel, a 1045 steel, a 1137 steel, a 1141 steel, a 1214 steel, a 1215 steel, a 4130 steel, a 4140 steel, a 8620 steel, a 52100 steel, a 4142 steel and a 1026 steel.

In some embodiments, the first internal seal 245, the second internal seal 250 or the third internal seal 255 are made of at least one material of a seal material set consisting of: a rubber material, a composite material, a rubber material, a non-rigid material, a foam material, a cork material, a silicone material, a fabric material, a neoprene material, a polytetra-fluoroethylene material and a plastic polymer material. Exemplary materials of the seal material set include, by way of non-limiting example, the following materials: a Vilton material, a EPDM material, a silicone material, a highly saturated nitrile material, a PTFE material, a PTFE Coated material, a PTFE Encapsulated material, a Kalrez material, a Chemraz material, a Simriz material, a Aflaz (TFE/P) material, a chloroprene material, a fluorosilicone material, a ethylene propylene material, a tetrafluoroethylene material, a propylene material, and any other material known to one skilled in the art to provide a liquid or air tight seal.

In some embodiments, the first internal seal 245, the second internal seal 250 or the third internal seal 255 are used for reducing the wear of the cylinder rod 140 from repeated motion and are made of at least one material of a wear ring material set consisting of: a ceramic material, a metal material, a plastic material, a composite material, a thermoset plastic, a thermoplastic, a glass material, a nylon material. Exemplary materials of the wear ring material set include, by way of non-limiting example, the following materials: an iron-copper material, a bronze material, a leaded bronze material, an aluminum-bronze material, an iron-copper material, a nylon plastic, a UHMW plastic, an acetal plastic, a PTFE plastic, a Rulon plastic, a Rulon J plastic, a Rulon LR plastic, a PEEK plastic, a vespel polyimide plastic, a frelon plastic, and any other material known to one skilled in the art to provide protection against respective wear.

Figure 16:
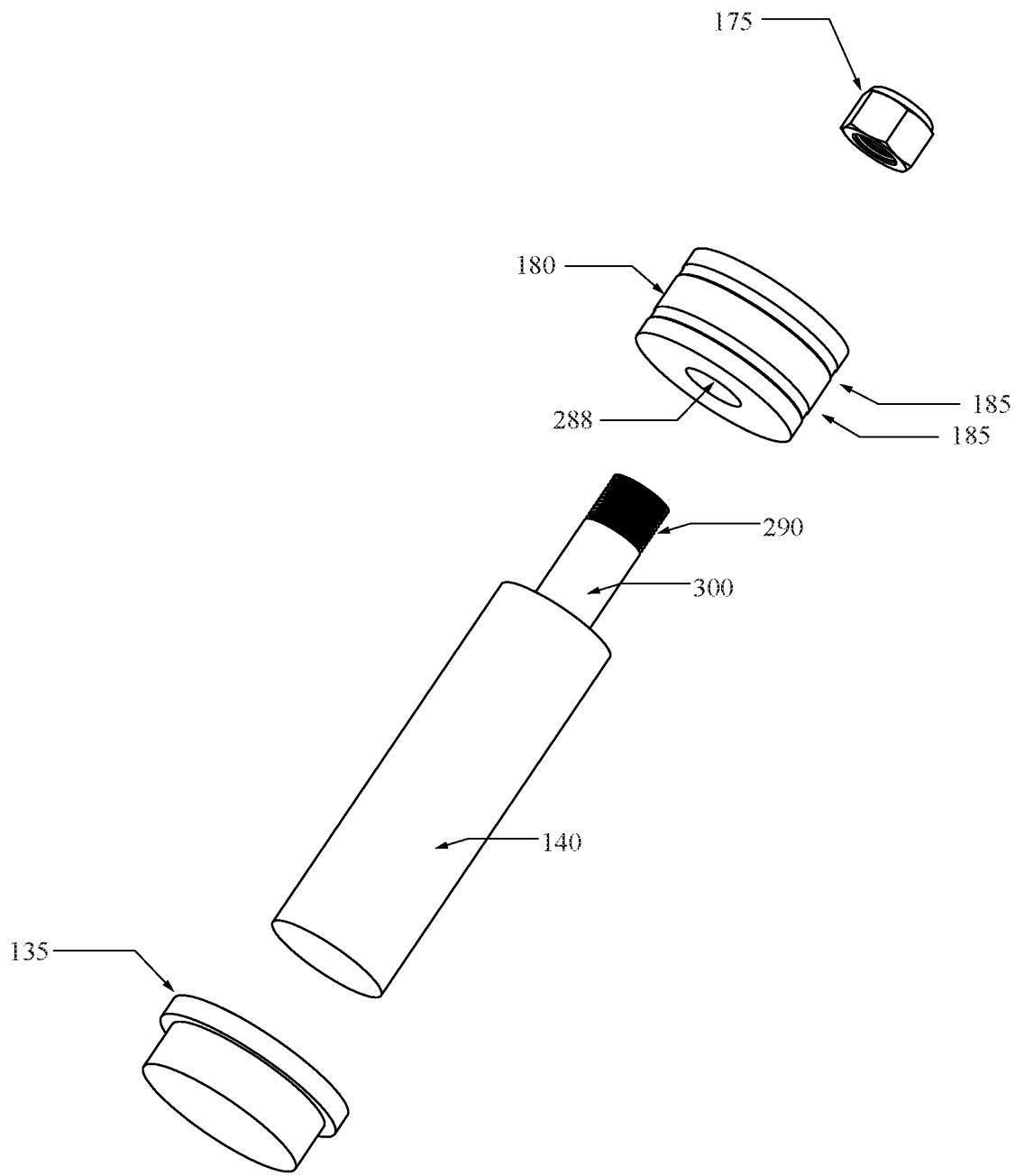
FIG. 16 shows an exemplary exploded view of one embodiment of the cylinder rod assembly of the trailer dampening system.
Figure 17:
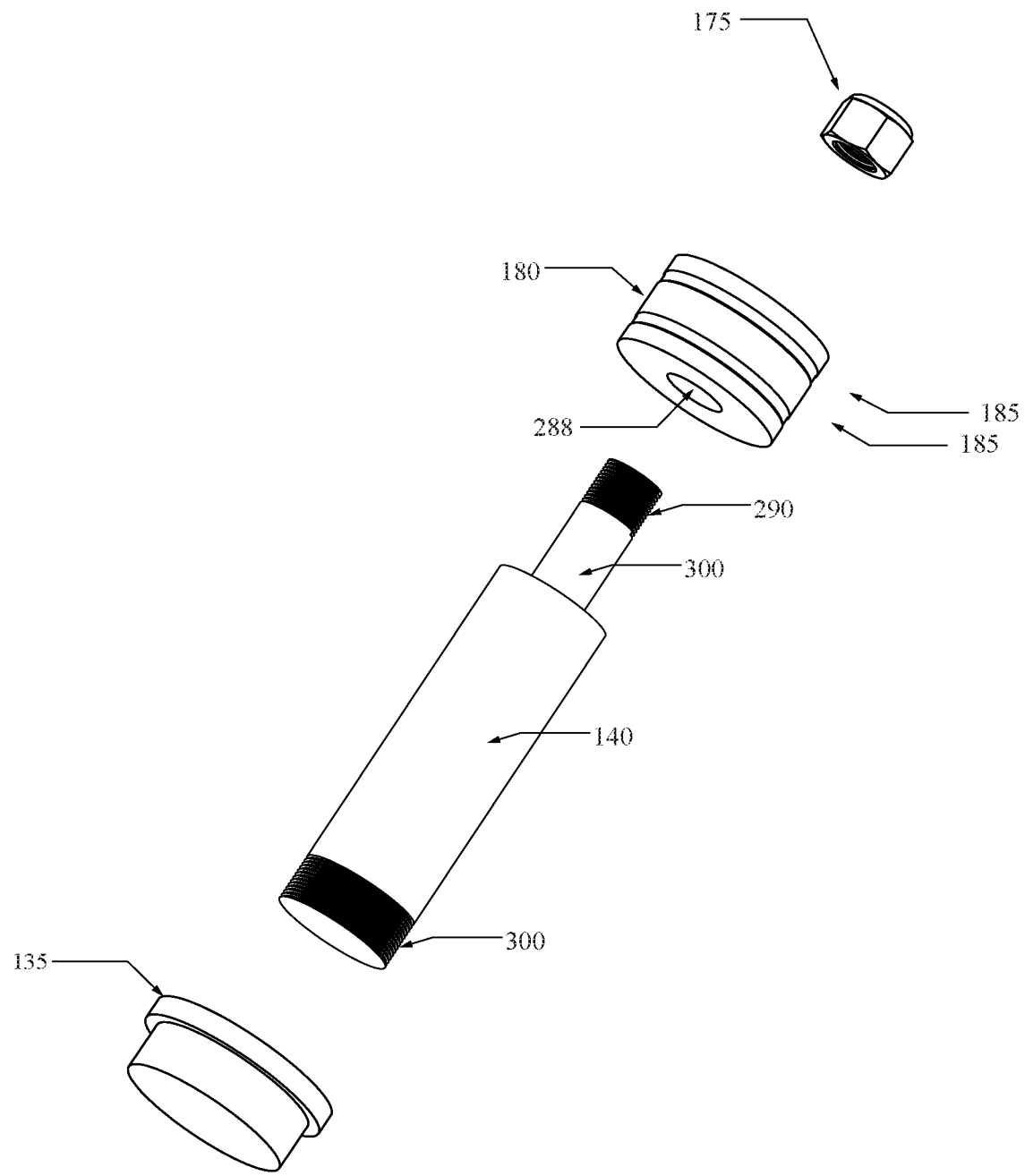
FIG. 17 shows an exemplary exploded view of one embodiment of the cylinder rod assembly of the trailer dampening system.

The cylinder rod 140 assembly and members of the connection assembly 150 are shown in FIGS. 13, 15A, 15B, 16 and 17. In some embodiments, the coupler end cap 135 is adjoined to the connection assembly 150 by a connection pin 145 through a connection hole 270. In some embodiments, the hitch of the connection assembly 150 is at least one member of a hitch set consisting of: a ball hitch, a kingpin hitch, a fifth wheel hitch, a gooseneck hitch, a pintle hitch and a weight-distributing hitch. The connection pin 145 therein allowing the user to interchange different members of the hitch set. In some embodiments, the coupler end cap 135 and the connection assembly 150 are not different components and are made into one singular piece. In other embodiments, at least two of following components of the trailer dampening system 100 are combined into one singular piece: the first end cap 110, the cylinder barrel 115, the second end cap 125, the base end cap 130. In other embodiments, at least two of following components of the trailer dampening system 100 are combined into one singular piece: the cylinder rod 140, the cylinder piston head 180, the piston end cap 175, the coupler end cap 135. In some embodiments, the cylinder rod 140 is adjoined to the base end cap 130 by a welded connection, as shown in FIG. 16. In other embodiments, the cylinder rod 140 is adjoined to the coupler end cap 135 by a fourth external threaded section 300 and the cylinder rod 140 is adjoined to the piston end cap 175 by a third external threaded section 290, as shown in FIG. 17.

Figure 18:
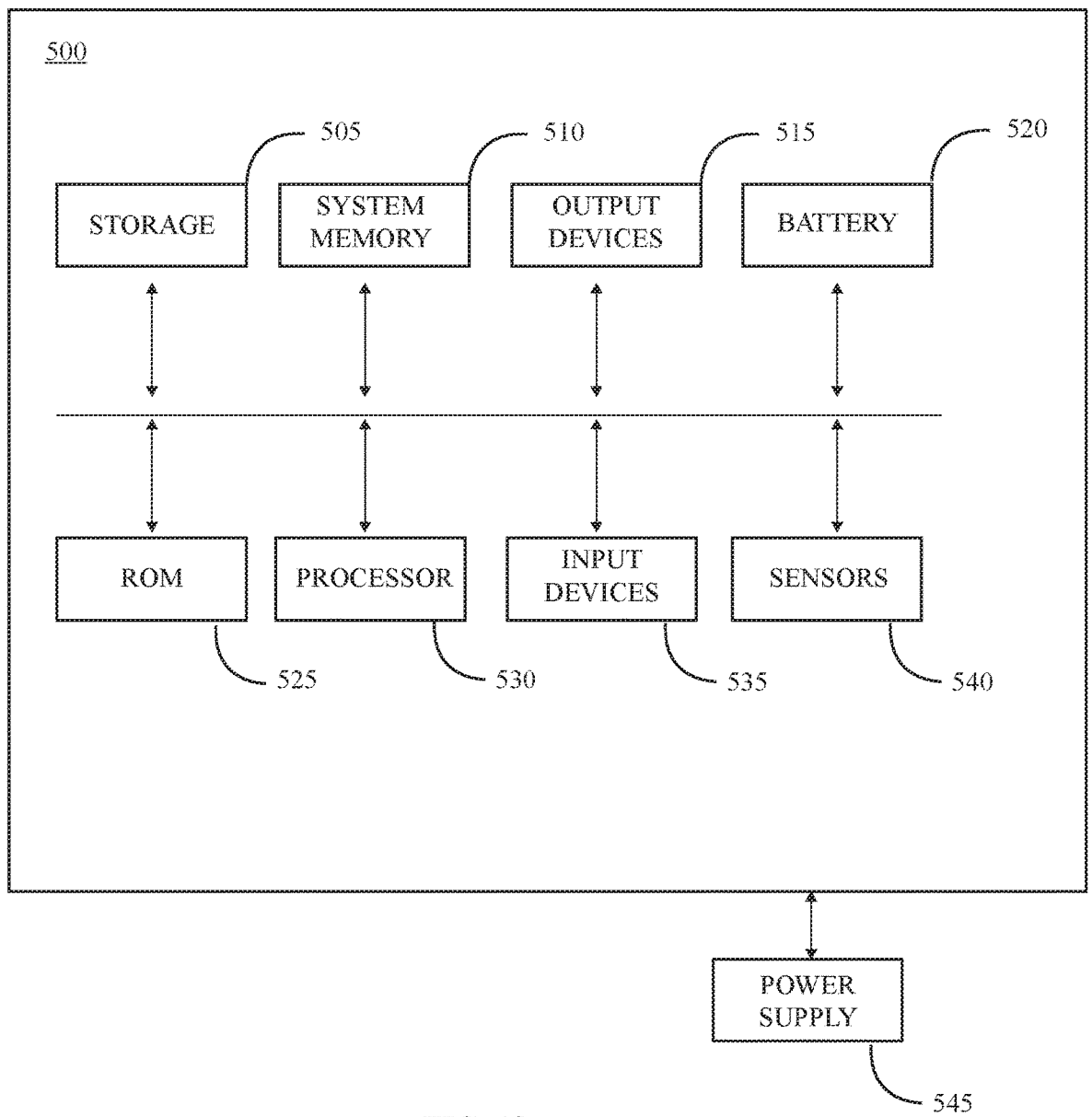
FIG. 18 shows an exemplary diagram of the electrical control assembly of one embodiment of the trailer dampening system.

As shown in FIG. 18 in some embodiments, the trailer dampening system 100 further comprises an electrical control system 500 connected to the valve assembly and having an input device 535 configured to receive an input, a memory 510, read-only memory 525, a power supply 545, a battery 520, a plurality of sensors 540, and a microcontroller and wherein the microcontroller is communicatively coupled to the input device and the plurality of sensors. The plurality of sensors configured to receive a sensor signal having a sensed data. In some embodiments, the microcontroller is programmed with instructions stored in memory to: perform a first instruction loop while the trailer dampening system 100 is pressurized to: (a) receive a sensor signal having a sensed data from the plurality of sensors; (b) amplify the sensed data; (c) filter the sensed data; (d) convert the sensor signal to a first digital sensor signal; (e) determine a first motion of the trailer; (e) determine a first pressure of the barrel assembly; and (f) determine a second pressure of the main reservoir. In some embodiments, at least one step of the first instruction loop is carried out by the microcontroller. In some embodiments, the first instruction loop further includes at least one of the following steps: manipulate the pressure of the internal volume, stop motion of the vehicle, stop motion of the trailer, detach the connection assembly 150 from the vehicle, decrease the internal volume, increase the internal volume, manipulate the pressure of the reservoir system 102, transmit the sensed data to a digital processing device, and store the first motion of the trailer to a storage unit.

In some embodiments, the electrical control assembly of the trailer dampening system 100 also includes a memory or a memory location (e.g., random-access memory, read-only memory, flash memory), electronic storage unit (e.g., hard disk), communication interface (e.g., network adapter) for communicating with one or more other systems, and peripheral devices, such as cache, other memory, data storage and/or electronic display adapters. The memory, the storage unit, the interface and the peripheral devices are in communication with a CPU through a communication bus (solid lines), such as a motherboard. The storage unit comprises a data storage unit (or data repository) for storing data. The trailer dampening system 100 is optionally operatively coupled to a computer network ("network") with the aid of the communication interface. The network, in various cases, is the internet, an internet, and/or extranet, or an intranet and/or extranet that is in communication with the internet. The network, in some cases, is a telecommunication and/or data network. The network optionally includes one or more computer servers, which enable distributed computing, such as cloud computing. The network, in some cases, with the aid of the trailer dampening system, implements a peer-to-peer network, which enables devices coupled to the trailer dampening system to behave as a client or a server.

In further embodiments, the storage unit comprises flash memory. In some embodiments, the nonvolatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, a mobile application is provided to the ground control station at the time it is manufactured. In other embodiments, the mobile application is provided to the ground control station via the computer network described herein. In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

In some embodiments, the platforms, systems, media, and methods disclosed herein include one or more databases, or use of the same. In view of the disclosure provided herein, those of skill in the art will recognize that many databases are suitable for storing data collected by the trailer dampening system. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet based. In further embodiments, a database is web-based. In still further embodiments, a database is cloud computing-based. In other embodiments, a database is based on one or more local computer storage devices.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the electrical control system of the trailer dampening system 100 further comprises an input device. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In still further embodiments, the input device is a combination of devices such as those disclosed herein.

In some embodiments, the communication member of the electrical control assembly comprises at least one member of a communication member set consisting of: a Wi-Fi device, a cellular device, a Bluetooth device, a satellite mobile communication device, a radio device, a LoRa device, a WLAN device, and a microwave communication device.

In some embodiments, a visual identification of the system in needed for public recognition and safety warnings to the user. In this embodiment, the trailer dampening system 100 further comprises at least one member of an identification set consisting of: an alphanumeric identification, a human user's name, a symbolic shape, a company brand, a numeric identification number, a QR code, a barcode, and an RFID tag.

The electrical control assembly of the trailer dampening system 100 includes a sensor configured to receive a sensed data. In some embodiments, the sensor comprises, by way of non-limiting example, a proximity sensor, a thermometer, GPS sensor, level, acoustic sensor, microphone, speaker, a microphone, an accelerometer, a load cell, an inclinometer, a resistometer, a counter, an RFID sensor, an ultrasonic sensor, a capacitive sensor, an inductive sensor, a magnetic sensor, an optical sensor, a radar, a sonar, or any combination thereof.

Figure 19:
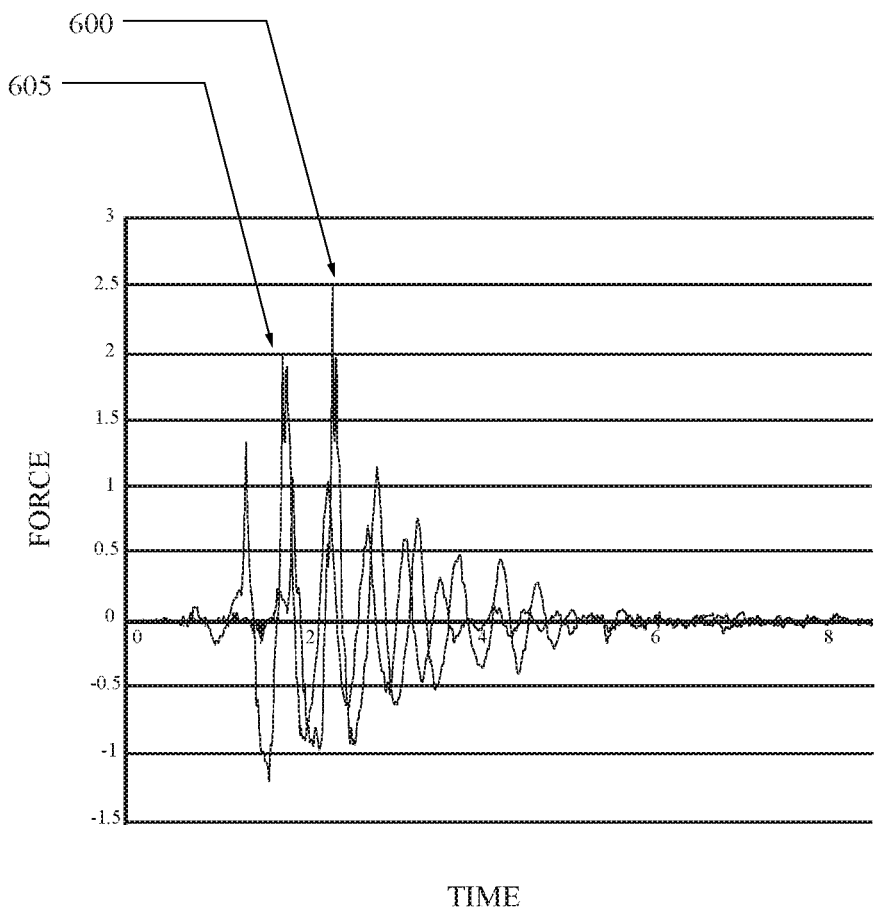
FIG. 19 shows an exemplary data plot illustrating the dampening of the cylinder rod assembly of the trailer dampening system.

FIG. 19 illustrates read-world experimental data as a result of testing the trailer dampening system 100 with an undampened sample plot 600 and a dampened sample plot 605.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A trailer dampening system, for reducing movement of a trailer towed by a vehicle, the trailer dampening system comprising:
   a barrel assembly, comprising:
      a cylinder barrel having a cylinder barrel proximal end, a cylinder barrel distal end and a cylinder barrel cavity;

a cylinder rod assembly, extending into the cylinder barrel and comprising:
  a cylinder rod having a cylinder rod proximal end and a cylinder rod distal end, wherein the cylinder rod is configured to move within the cylinder barrel;
  a cylinder piston head connected to the cylinder rod distal end and within the cylinder barrel cavity;
  an internal volume formed within the cylinder barrel cavity between the cylinder piston head and the cylinder barrel distal end;
a connection assembly, adjoined to the cylinder rod proximal end and wherein the connection assembly may be removed and configured to match a receiver of the vehicle;
  wherein in a first mode of operation the trailer dampening system is positioned between the vehicle and the trailer, wherein a pressure within the internal volume alters movement of the cylinder rod assembly.

2. The system of claim 1, wherein the connection assembly further comprises:
  a coupler end cap having a coupler end cap proximal end and a coupler end cap distal end and positioned between the cylinder rod distal end and the connection assembly.

3. The system of claim 1, wherein the cylinder barrel further comprises:
  a second end cap positioned between and adjoined to the base end cap and the cylinder barrel proximal end and having a second end cap opening extending through the second end cap, wherein the second end cap opening includes at least one internal seal.

4. The system of claim 1, wherein the base end cap opening further comprises at least one internal seal.

5. The system of claim 1, wherein the cylinder piston head further comprises an external groove, wherein the external groove is adapted to hold at least one external seal.

6. The system of claim 1, wherein the cylinder piston head further comprises:
  a piston end cap, removably adjoined to a third external threaded section on the cylinder rod distal end;
  wherein during assembly the cylinder piston head is secured onto the cylinder rod between the piston end cap and the cylinder rod distal end.

7. The system of claim 1, wherein the barrel assembly further comprises:
  at least one port extending through the barrel assembly, wherein the at least one port allows access to the cylinder barrel cavity of the cylinder barrel;
  a reservoir system having a main reservoir, a valve assembly, and at least one connection line; wherein the valve assembly is adjoined to the at least one connection line; wherein the at least one connection line provides a fluid connection between the main reservoir and the cylinder barrel cavity.

8. The system of claim 7, wherein the reservoir system further comprises an electrical control system connected to the valve assembly and having an input device configured to receive an input, a battery, a plurality of sensors, and a microcontroller; wherein the microcontroller is communicatively coupled to the input device and the plurality of sensors;
  wherein the microcontroller is programmed with instructions stored in memory to:
  perform a first instruction loop while the trailer dampening system is pressurized to:
    (a) receive a sensor signal having a sensed data from the plurality of sensors;
    (b) amplify the sensed data;
    (c) filter the sensed data;
    (d) convert the sensor signal to a first digital sensor signal;
    (e) determine a first motion of the trailer;
    (e) determine a first pressure of the barrel assembly; and
    (f) determine a second pressure of the main reservoir.

9. The system of claim 8, further comprising a communication member communicatively coupled with the microcontroller; wherein the microcontroller is programmed with further instructions to:
  transmit the sensed data to a digital processing device.

10. The system of claim 9, the communication member comprises at least one member of a communication member set consisting of: a Wi-fi device, a cellular device, a Bluetooth device, a satellite mobile communication device, a radio device, a LoRa device, a WLAN device, and a microwave communication device.

11. The system of claim 8, wherein the microcontroller is programmed with further instructions to:
  store the first motion of the trailer to a storage unit.

12. The system of claim 7, wherein the reservoir system is further joined to the vehicle.

13. The system of claim 7, wherein the reservoir system is further joined to the trailer.

14. The system of claim 7, wherein the reservoir system further comprises a plurality of main reservoirs.

15. The system of claim 7, wherein the barrel assembly further comprises:
  an electrical control system connected to the valve assembly and having an input device configured to receive an input, a battery, a plurality of sensors, and a microcontroller; wherein the microcontroller is communicatively coupled to the input device and the plurality of sensors;
  wherein the microcontroller is programmed with instructions stored in memory to:
  perform a first instruction loop while the trailer dampening system is pressurized to:
    (a) receive a sensor signal having a sensed data from the plurality of sensors;
    (b) amplify the sensed data;
    (c) filter the sensed data;
    (d) convert the sensor signal to a first digital sensor signal;
    (e) determine a first motion of the trailer; and
    (e) determine a first pressure of the barrel assembly.

16. The system of claim 1, wherein the barrel assembly further comprises:
  a first end cap adjoined to the cylinder barrel distal end;
  at least one port extending through the first end cap, wherein the at least one port allows access to the internal volume of the cylinder barrel cavity of the cylinder barrel.

17. The system of claim 1, wherein the internal volume of the barrel assembly is pressurized by one member of a pressure material set consisting of: an oil, a fluid, and a volume of pressurized air.

18. The system of claim 1, wherein the connection assembly is adapted for use with at least one member of a hitch set consisting of: a ball hitch, a kingpin hitch, a fifth wheel hitch, a gooseneck hitch, a pintle hitch and a weight-distributing hitch.

19. The system of claim 1, wherein the receiver is adapted for use with at least one member of a hitch set consisting of: a ball hitch, a kingpin hitch, a fifth wheel hitch, a gooseneck hitch, a pintle hitch and a weight-distributing hitch.

20. The system of claim 1, wherein the barrel assembly comprises an external texture to grip a hand of a human.

21. The system of claim 20, wherein the external texture further comprises at least one member of a texture set consisting of: indentations, extrusions, knurling, a rough surface, and bumps.

22. The system of claim 1, wherein the trailer dampening system further comprises at least one member of an identification set consisting of: an alphanumeric identification, a human user's name, a symbolic shape, a company brand, a numeric identification number, a QR code, a barcode, and an RFID tag.

23. The system of claim 1, wherein the cylinder barrel further comprises:
 a base end cap adjoined to the cylinder barrel proximal end and having a base end cap opening;
 wherein the cylinder rod is configured to move within the cylinder barrel within the base end cap opening.

24. A trailer dampening system, for reducing movement of a trailer towed by a vehicle, the trailer dampening system comprising:
 a barrel assembly, comprising:
 a cylinder barrel having a cylinder barrel proximal end, a cylinder barrel distal end and a cylinder barrel cavity;
 a cylinder rod assembly, extending into the cylinder barrel and comprising:
 a cylinder rod having a cylinder rod proximal end and a cylinder rod distal end, wherein the cylinder rod is configured to move within the cylinder barrel;
 an internal volume formed within the cylinder barrel cavity between the cylinder piston head and the cylinder barrel distal end;
 an electrical control system communicatively coupled to the internal volume;
 wherein in a first mode of operation the trailer dampening system is positioned between the vehicle and the trailer, wherein a pressure within the internal volume is controlled by the electrical control system to alter movement of the cylinder rod assembly.

25. The system of claim 24, further comprising:
 a connection assembly, adjoined to the cylinder rod proximal end and wherein the connection assembly may be removed and configured to match a receiver of the vehicle.

26. The system of claim 25, wherein the connection assembly is adapted for use with at least one member of a hitch set consisting of: a ball hitch, a kingpin hitch, a fifth wheel hitch, a gooseneck hitch, a pintle hitch and a weight-distributing hitch.

* * * * *